United States Patent [19]

McMaster et al.

[11] 3,708,745
[45] Jan. 2, 1973

[54] SYSTEM FOR MEASURING OUTPUT POWER OF A RESONANT PIEZOELECTRIC ELECTROMECHANICAL TRANSDUCER

[75] Inventors: Robert C. McMaster; Charles C. Libby, both of Columbus, Ohio

[73] Assignee: The Board of Trustees of the Ohio State University, Columbus, Ohio

[22] Filed: Nov. 12, 1970

[21] Appl. No.: 89,059

Related U.S. Application Data

[60] Division of Ser. No. 852,980, Aug. 19, 1969, abandoned, which is a continuation of Ser. No. 508,804, Nov. 19, 1965.

[52] U.S. Cl. ................ 324/56, 310/8.1, 310/8.2
[51] Int. Cl. ............................................. G01r 29/22
[58] Field of Search .......... 324/56, 127; 310/8.1, 8.2, 310/8.3; 333/30; 73/71.4, 67.2

[56] References Cited

UNITED STATES PATENTS

| 1,799,634 | 4/1931 | Norton | 333/30 M |
|---|---|---|---|
| 2,137,852 | 11/1938 | Nicolson | 310/8.3 X |
| 2,503,831 | 4/1950 | Mason | 333/30 |
| 2,661,622 | 12/1953 | Severs | 73/71.4 |
| 3,176,788 | 4/1965 | Harris | 333/30 M |
| 3,331,023 | 7/1967 | Adkins et al. | 324/127 |
| 3,504,281 | 3/1970 | Cromer et al. | 324/127 |

*Primary Examiner*—Gerard R. Strecker
*Attorney*—Anthony D. Cennamo

[57] ABSTRACT

A measuring system utilizing a resonant piezoelectric electromechanical transducer of the horn type having connected to the tip of the horn a transmission line whose length is in multiples of one-half wavelength. A transducer whose output capabilities are to be measured is connected to the other end of the transmission line and therefore excited mechanically. The electrical signal derived therefrom is indicative of its output parameters.

6 Claims, 6 Drawing Figures

SYSTEM FOR MEASURING OUTPUT POWER OF A RESONANT PIEZOELECTRIC ELECTROMECHANICAL TRANSDUCER

BACKGROUND OF THE INVENTION

This application is a divisional of Ser. No. 852,980 filed Aug. 19, 1969, now abandoned which is a continuation of Ser. No. 508,804 filed Nov. 19, 1965.

A piezoelectric transducer is a device capable of transforming high frequency electrical impulses into high frequency mechanical impulses. With an alternating-polarity input-voltage imposed on the piezoelectric (ceramic) elements, the transducer generates, transmits and amplifies a series of mechanical compression waves in its metal supporting structure. The succession of identical waves of compression and tension, transmitted in a transducer of proper length, produces a standing wave pattern.

In a straight rod the standing wave maximum and minimum locations correspond to locations of maximum and minimum velocity, maximum and minimum stress, and maximum and minimum displacement. These locations determine optimum positions for points-of-support, "steps" or changes in diameter, tools or mechanical couplers, etc.

The prior art is replete with various forms of electromechanical transducers. Piezoelectric, as well as magnetrictive devices, have been developed for various and sundry applications. The uses of sonic energy have been suggested extensively in all fields of endeavor including cleaning processes, chemical and physical processes, work transfer, measuring instruments, communications and electrical delay lines, filters and relays.

There is disclosed in U.S. Pat. No. 3,368,085, for "Sonic Transducer," by Robert C. McMaster and Berndt B. Dettloff, a sonic generator that combines the driving element (transducer) with the mechanical displacement amplifier (horn). It is in essence a resonant horn structure excited internally close to the vibrational node. The excitation is in contrast to the external excitation common when horns are utilized in a sonic transducer system. The generator therein disclosed is capable of extremely high power, is a high Q generator, exceptionally rugged, compact, and capable of carrying continuous work loads. In terms of application, it is intended for purposes to which many of the prior art devices are drawn.

BRIEF DESCRIPTION OF THE INVENTION

The motor generator of the present invention is not directed to the utilization of the generated force as a mechanically vibrating work load. To the contrary, the device is intended for the transfer of energy from one point to another — at the remote point the energy of the transducer than may be utilized in a conventional manner. Further, with the use of said transducers, high power energy is transferred with high efficiency.

OBJECTS OF THE INVENTION

It is a principal object of the present invention to provide a new and improved motor-generator for the transfer and transformation of energy.

Another object of the invention is to provide a motor generator for the transfer and transformation of high power energy.

A further object of the invention is to provide a motor generator for the transfer of high power energy that is extremely rugged and capable of heavy industrial work loads.

Further objects and features of the present invention will become apparent from the following detailed description when taken in conjunction with the drawings in which:

DESCRIPTION OF THE PREFERRED EMBODIMENTS

Referring generally to the embodiments in the several figures, the invention comprises two or more transducers of the horn piezoelectric type. In the preferred embodiment the two transducers are coupled at the tip of their horns, i.e., at their work points. In operation, the one transducer drives the other as a motor generator set. Alternately, the transducers may be interconnected at the horn tips or interconnected at the end opposite the horn tip or the tip of one connected to the body of the other. They may be of equal size and type or of differing size or type.

In relatively short over-all lengths, the two transducers plus the transmission line connecting them must be a multiple of one-half wavelength for maximum energy transfer. In its simplest embodiment a one-half wave resonant transmission line is added between two transducers. This develops a node point or a point of zero longitudinal displacement halfway between the transducers. In transmission lines longer than 2 – 3 wavelengths energy is transferred without reference to limits as to length.

In one arrangement of a preferred embodiment, vibratory energy is passed through a selected medium or test material before reconverting it into measurable quantities of electrical energy.

As pointed out hereinafter, if a one-half wavelength of transmission line material is used, a node point is located midway between the motor and generator elements wherein no axial vibration is detectable. This point may be fixed in place mechanically. Another unique feature is that longitudinal losses in the test material (located between motor and generator) may be measured as well as stress; instantaneous variations in radial or axial stress may be recorded easily since there is no rotation of the test sample and fatigue testing is accelerated as many thousands of stress reversals may be produced each second in the test sample.

For maximum output capability the transducers must resonate at the same frequency, and the electrical resistance of the load on the generator-transducer must be matched to the characteristic impedance of this transducer at resonance. If the electrical input is supplied with a frequency equal to the resonant frequency of the motor generator set, a voltage approximately equal in amplitude to that of the applied voltage will appear at the generator terminals. Varying the load resistance will affect the output voltage, current and power much the same way as in a synchronous rotating motor generator set of the rotating type except under short circuit conditions.

Figure 1:
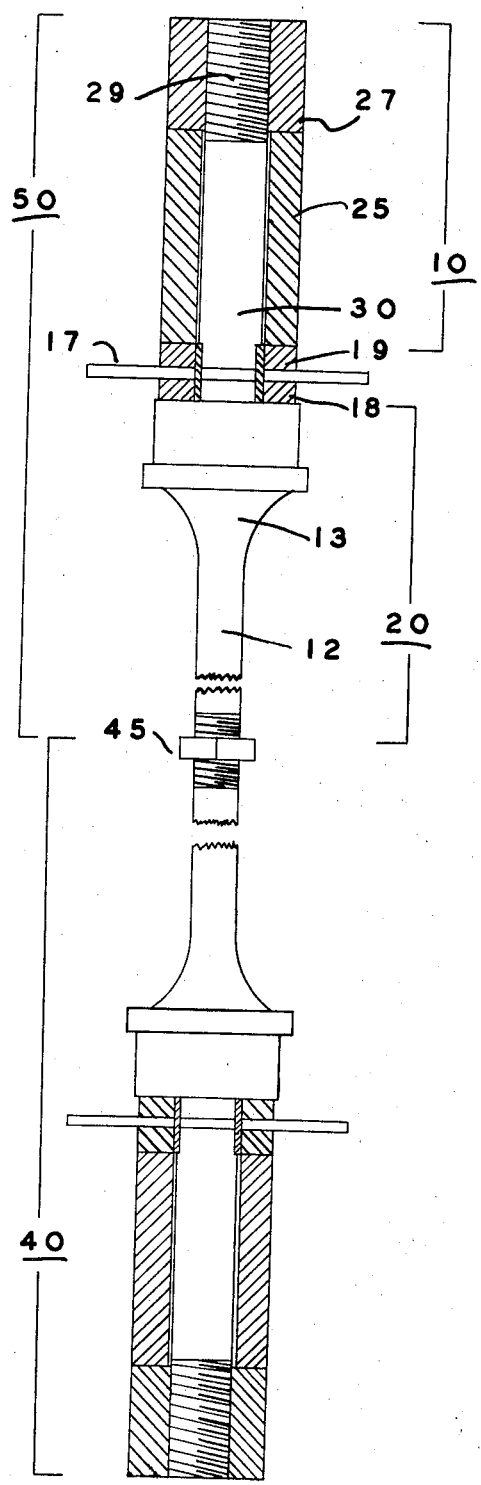
FIG. 1 is a preferred embodiment of the motor generator of the present invention.

Referring now specifically to FIG. 1, the motor generator of the present invention comprises two complete transducers. Each of the transducers 40 and 50 are identical in construction and operation to that of the aforementioned U.S. Pat. No. 3,368,085. Other resonant horn type of transducers may be substituted. The two transducers are each generally and respectively referred to as 40 and 50, joined at the tip of their respective horns, such as by coupling element 45. Specifically, each of the transducers 40 and 50 is a stepped horn half wavelength long and each one subdivided into two parts, a straight generator part 10 and a tapering force concentrator part 20. The two piezoelectric elements, 18 and 19, acting mechanically in series, are positioned between the two parts, 10 and 20. The part 10 which includes a center bolt 30 integrally formed with the step 13. A cylindrical sleeve 25 is placed over the bolt 30 whose end insulatedly abuts the piezoelectric crystal 19. A nut 27 turning on the threaded end of bolt 29 presses down upon the active elements, i.e., sleeve 25 and in turn the piezoelectric crystals 18 and 19. The nut 27 has the same diameter as, and actually forms a continuation of, the generator part 10 of the transducer 50.

The problem of tension in the piezoelectric elements or across the joints has been solved in this design by application of mechanical bias. This bias is applied by center bolt 30 as a compressive stress larger in magnitude than the alternating stress amplitude generated in the piezoelectric elements.

The slender output end of the horn part 12 of the transducer is considerably less in diameter than the large end 25 and has an amplitude of vibration governed by geometry. The two piezoelectric elements 18 and 19 are nominally of a diameter equivalent to upper part 25. The piezoelectric elements are connected in parallel electrically by a common electrode 17 between them. This electrode 17 has a hole in the center. The bolt 30 runs through the piezoelectric discs 18 and 19 and the electrode 17 and is insulated therefrom by a sleeve of electrical insulating material such as fiberglass impregnated with a bonding resin.

The step 13 in the horn has been located half an inch (in this embodiment) below the node and the piezoelectric elements 18 and 19 have been located above the node. Although this location may cause a small reduction in amplification, the step and the active elements are spaced apart to make the node available for attachment of clamps and holding fixtures and to provide a stiff seat for the piezoelectric discs.

The aforementioned patent describes graphically the resonant structure of FIG. 1 relative to stress and displacement.

Figure 2:
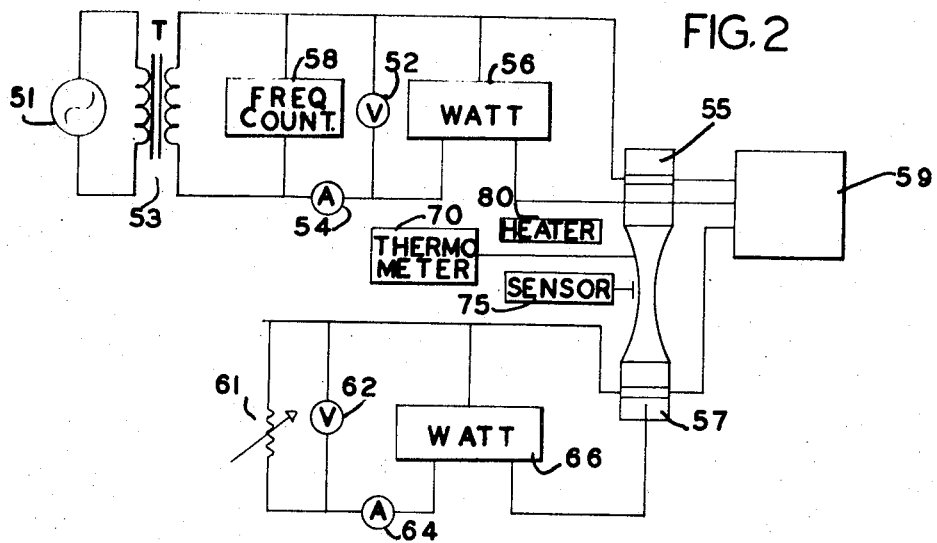
FIG. 2 is a schematic circuit in block of a load test for the transducer of FIG. 1.

The acoustic motor generator set has proved to be most effective as a means of evaluating other sonic and ultrasonic transducers. The motor generator of the present invention, as pointed out above, consists of two identical transducers, mechanically coupled at their point of maximum vibration, i.e., their tips. For a typical load test of a piezoelectric transducer, one of these transducers is connected electrically to a suitable source of electrical energy and the other to a noninductive, variable resistance load. This is shown schematically in FIG. 2. Generator 51 applies high power energy through transformer 53 to one of the two interconnected transducers 55 making up the motor generator. Connected to the other of the two interconnected transducers 57 is the resistance load 61. The volt meters 52 and 62, ammeter 54 and 64, and wattmeters 56 and 66, serve in a conventional manner for indicating voltage, current, and power. The cathode ray oscilloscope visually indicates the wave shape and phase displacement of applied and generated voltages at the electrical terminals of the respective transducers 55 and 57. The thermometer 70 may be connected directly to the generator to register temperature. One of these transducers is connected electrically to a suitable source of electrical energy and the other to a noninductive, variable, resistance load.

From a test of this type, it is possible to measure input, output power in watts, resonant-frequency in cycles per second, transducer temperature, voltage and current supplied to the motor and produced by the generator. The wave shape of the input, output voltage, and current and the phase displacement between them, is recorded on the dual-trace cathode-ray oscilloscope 59. In addition, the amplitude of vibration is determined by a scaled-microscope or displacement-sensor 75 and measured as maximum excursion at any location along the length of the transducers. From this data it is possible to determine motor generator efficiency in percent, optimum load impedance in ohms, transducer power factor in percent, transducer losses in watts, maximum output in watts, force generated in pounds, maximum stresses developed in pounds per square inch.

This unusually wide variety of performance test data, readily obtainable and constant during any reasonable time interval, illustrates the unique quality of the acoustic motor generator test. If it is required that variations in resonant frequency be eliminated during a test, it will be necessary to maintain the transducer temperature at a constant level. Controlled heating has been used successfully for this purpose, by making use of the input high frequency alternating current for induction heating 80 of the transducer horn.

A variable-frequency source, supplying power to a well instrumented acoustic motor generator test setup provides data for determination of the mechanical Q or quality factor of the transducer, its fundamental and multiple resonant frequencies, in addition to that available from a constant frequency test. This test also permits determination of steady state temperature change from no load to full load continuously, despite the 2 or 3 percent variation in resonance frequency which is typical of transducers carrying conventional loads.

These test data provide a well documented picture of the acoustic properties of a transducer. Having secured these data, the transducer may be considered to be a calibrated instrument, or probe, useful in analyzing various types of loads as well as measuring performance characteristics of the unknown transducers.

The acoustic motor generator set is proving to be of significant value as a means of life-testing of transducers, measuring transducer load characteristics, and supplying a calibrated probe for investigating possible variations in acoustic design. However, its limitations in transducer performance may be expected when matched distributed impedance loads are connected directly to the driver, impact tools are connected intermittently, or, lumped impedance loads are connected directly. The acoustic motor generator set technique establishes the maximum output possible under certain well defined conditions; it does not predict transducer output to an unmatched or lumped impedance or to a transient viscous load.

The calibrated acoustic motor generator set has also considerable value as a means of evaluating acoustic transmission lines which provide a mechanical link between the transducer and a lumped impedance load. Such transmission lines are useful in improving flexibility of the application of transducers, in coupling transducers together, in providing additional node points for support and in matching various load impedance to a single transducer.

Of most significance, is the transmission of energy with the transducer of the present invention. High power electrical energy may be transferred from one point to another "mechanically." A typical situation may be a pressure vessel that would not be amenable to high voltage lines passing therethrough. With the transducer of the present invention, only a mechanical connection is required on the wall of the vessel.

Finally, other applications of the motor generator set of the present invention may be.

The portion illustrated is that of only the mechanical structure that makes up the linear transmission line for the high power energy.

Figure 3A:
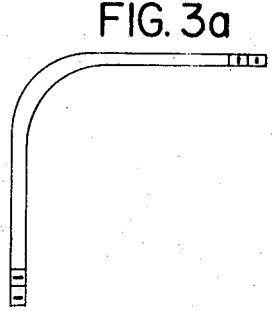
FIGS. 3a and 3b illustrate a pair of curved transmission lines having different shapes at their common point.
Figure 3B:
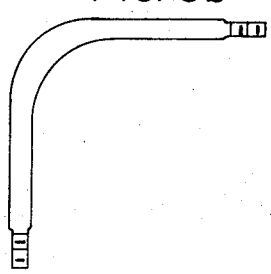

There is shown in FIG. 3 an alternative embodiment of transmission line utilized as part of the invention for the transmission of energy. Simply, this curved element permits the energy to be transferred in a direction other than a direct or straight line.

Figures 4A, 4B:
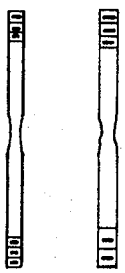
FIGS. 4a and 4b illustrate a pair of transmission lines having a straight configuration but a different diameter.

In FIG. 4 there is shown another transmission line having a varying configuration at the common point. The length of the transmission line determines the distance over which energy is to be transmitted.

Although we have shown a certain and specific embodiment, it is to be understood that departures and modifications may be had without departing from the true spirit and scope of the invention. For instance, the preferred embodiment of FIG. 1 may be utilized as a wave filter. That is, in the transmission and conversion of electrical power, the input waveform may be other than sinusoidal whereas the output voltage waveform will be sinusoidal. The current wave form will also be sinusoidal with a linear load. This phenomenon is attributed to the structure illustrated in FIG. 1 as the preferred embodiment as being a resonant structure.

What is claimed is:

1. A test system for indicating the output power of an electromechanical transducer consisting of a resonant structure including piezoelectric driving means integrally formed therewith and operative as a high Q transducer comprising:
    a second resonant electromechanical transducer having mechanical and electrical properties identical to said transducer for which said output power is to be indicated,
    a half-wave transmission line for mechanically joining said transducers at their points of near maximum longitudinal displacement,
    means for connecting said second transducer to a variable electrical load,
    means for electrically exciting said test transducer structure at its resonant frequency and
    means for indicating the output power of said second transducer.

2. A test system as set forth in claim 1 wherein each of said transducers has a tapered portion and wherein said tapered portion is a horn type of amplifier, and wherein said transmission line joins said horns at their points of near maximum longitudinal displacement.

3. A test system as set forth in claim 2 wherein said transmission line has a midpoint of near zero longitudinal physical displacement.

4. A test system as set forth in claim 1 wherein said transmission line is of substantially uniform cross section and approximates in diameter said horns at the point of joining.

5. A test system as set forth in claim 1 wherein said electrical excitation means may have a nonsinusoidal waveform and wherein said transformed energy is a sinusoidal waveform.

6. A test system as set forth in claim 5 wherein said transmission line coupling said horns at their points of near maximum longitudinal displacement is linear.

* * * * *